March 30, 1965  J. A. FINNERTY  3,176,310
MAGAZINE-LOADED SOUND MOTION PICTURE PROJECTOR
Filed Sept. 24, 1962  3 Sheets-Sheet 2
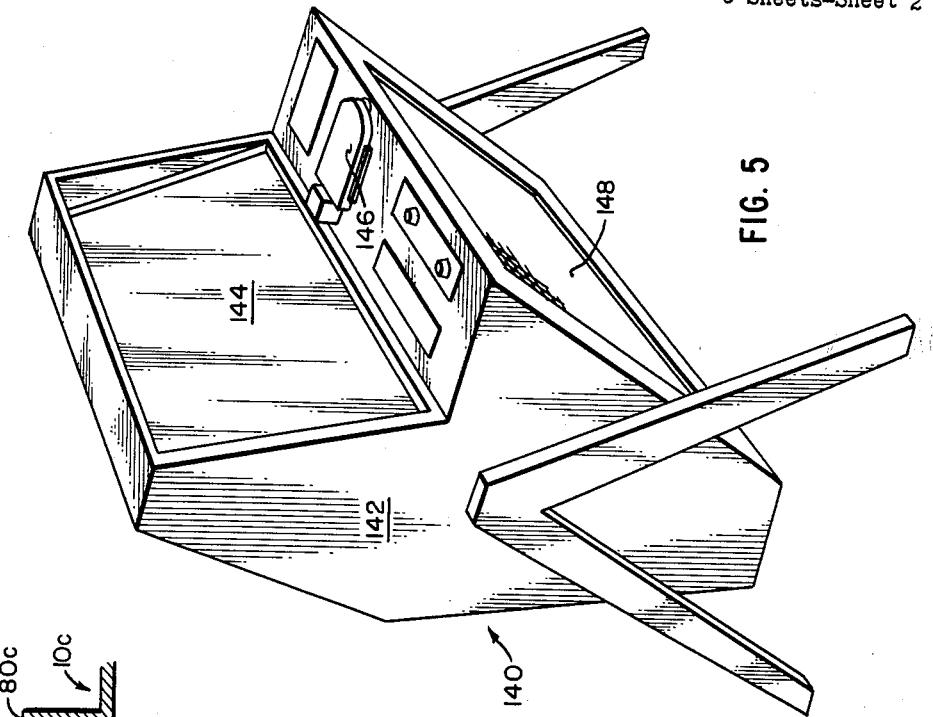
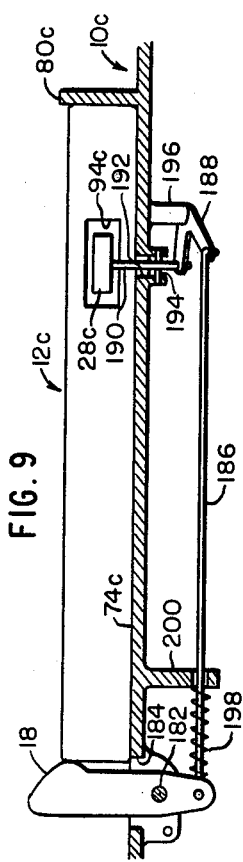
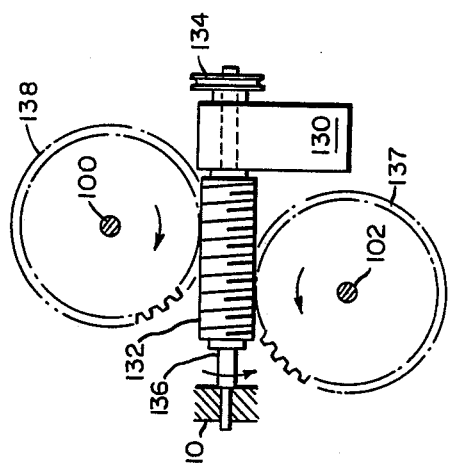
INVENTOR.
JOHN A. FINNERTY
BY *Kenway, Jenney & Hildreth*
ATTORNEYS March 30, 1965     J. A. FINNERTY     3,176,310
MAGAZINE-LOADED SOUND MOTION PICTURE PROJECTOR
Filed Sept. 24, 1962     3 Sheets-Sheet 3
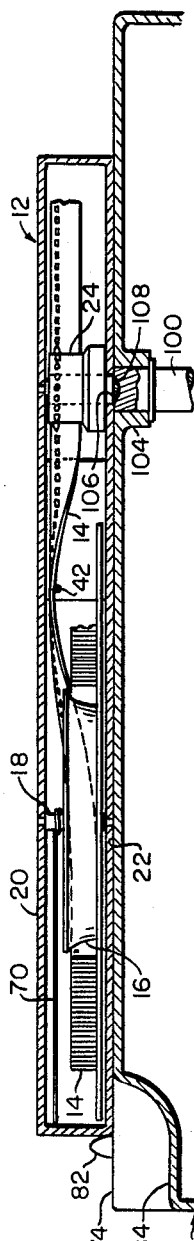
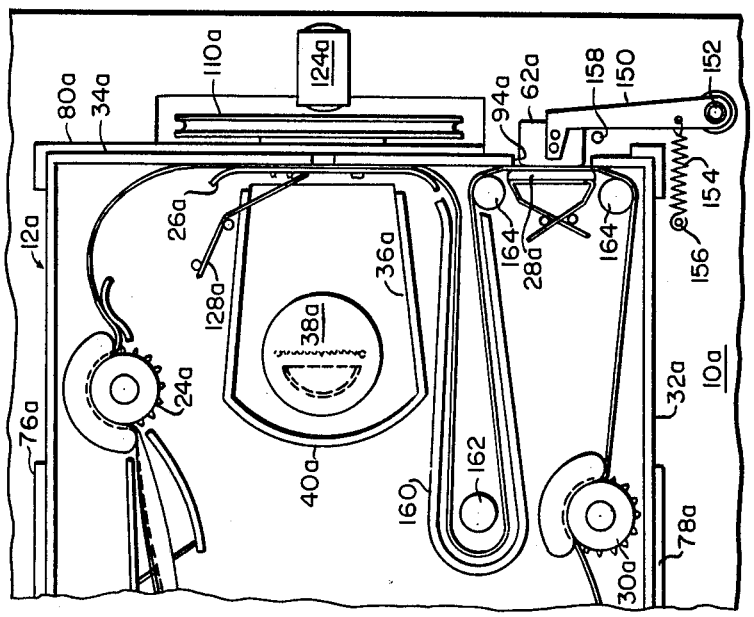
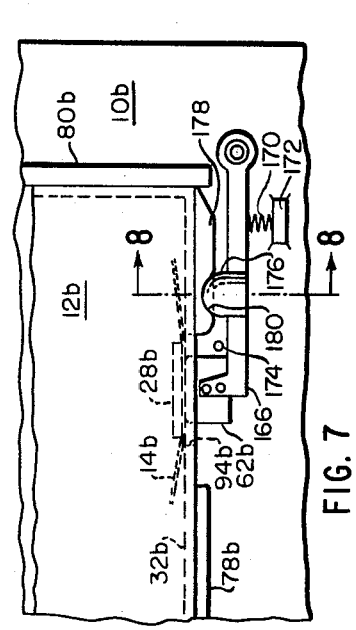
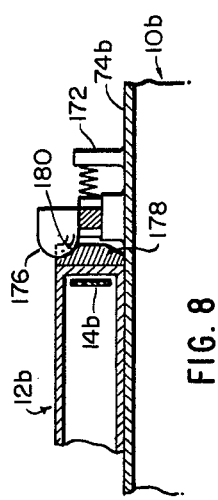
FIG. 4
FIG. 6
FIG. 7
FIG. 8
INVENTOR.
JOHN A. FINNERTY
BY Kenway, Jenney & Hildreth
ATTORNEYS

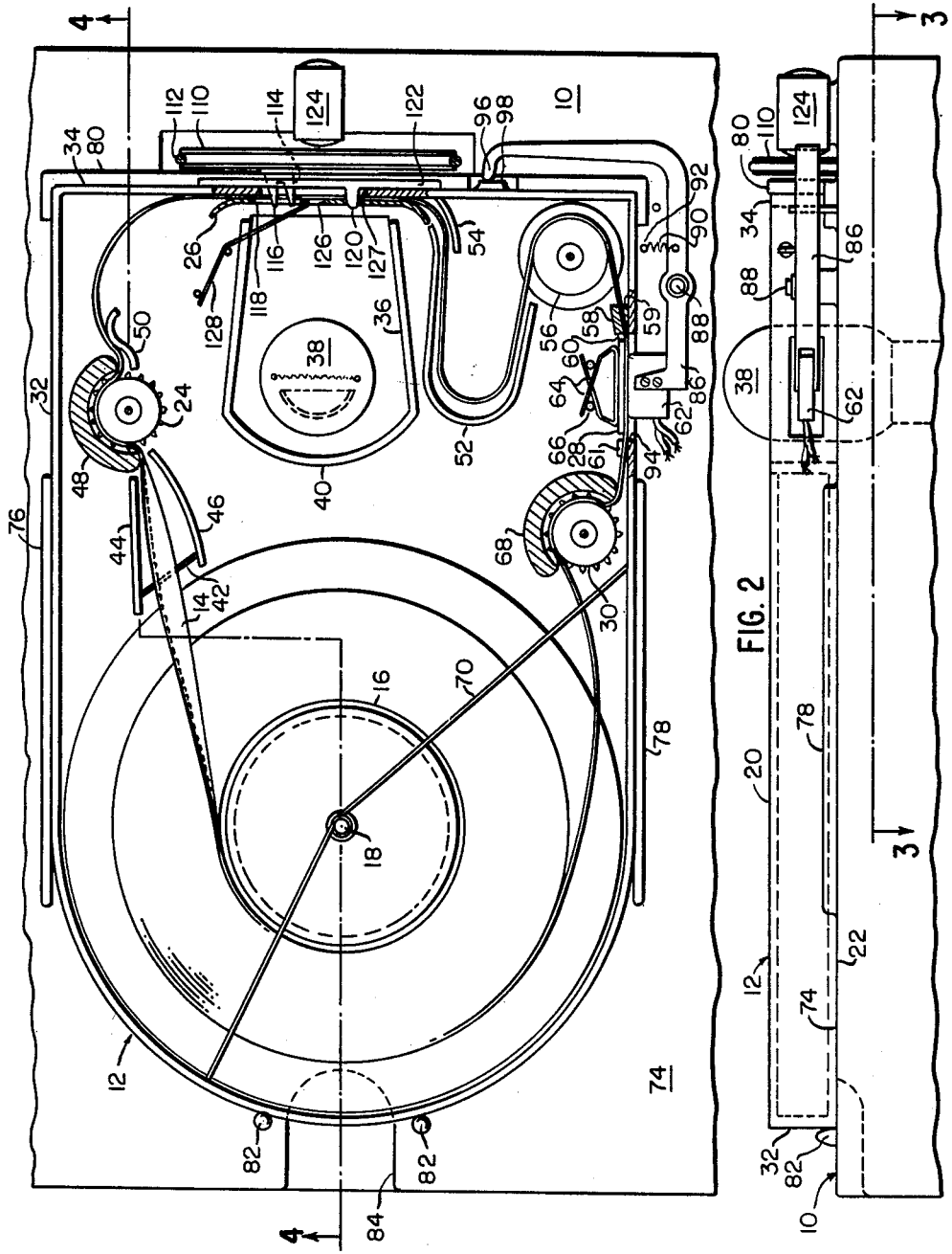

United States Patent Office 3,176,310
Patented Mar. 30, 1965

3,176,310
MAGAZINE-LOADED SOUND MOTION
PICTURE PROJECTOR
John A. Finnerty, Waban, Mass., assignor to Morris L.
Berman and H. Hyland Gross, Brookline, Richard S.
Rogers, Milton, and Jason M. Poster, Waban, Mass.
Filed Sept. 24, 1962, Ser. No. 225,670
6 Claims. (Cl. 352—29)

This invention relates to a magazine-loaded sound motion picture projector, and has as its primary object the provision of an improved projector and a cooperating self-contained film magazine by means of which an endless coil of film may be projected without handling. The improved magazine is engageable or disengageable with the projector by a single manual movement, which serves automatically to position both a film projection gate and a sound pick-up gate of the magazine in operative relation to an intermittent film drive and shutter mechanism, and a sound pick-up head, forming portions of the projector.

It is another object of my invention to provide an improved magazine of improved and simplified structure. This magazine eliminates the requirement of many previously proposed projectors for a system of reflectors, necessary to pass a beam of light generated by a bulb mounted interiorly within the projector through a film gate in the magazine.

A drawback common to many prior magazine projectors is that the magazine itself is complex in structure and is, therefore, unduly expensive to manufacture in large quantities; and it is a further object of the present invention to provide a magazine and projector of reduced structural complexity, which may be economically produced in large quantities, and thus bring to a modest level the cost to the consumer. Additional objects and advantages of the invention will become apparent as the following description proceeds.

Briefly stated, I may carry out my invention in a preferred embodiment by providing a magazine housing with a reel or other suitable means for storing an endless coil of film, and with drive sprockets and idlers for guiding the film from the reel into close juxtaposition to a first or projection aperture, and serially to a second or sound aperture, and for thence returning the projected film to the storage reel. I provide the magazine housing with a walled opening extending transversely therethrough in a direction lateral to the film, for receiving a projection lamp when the magazine is assembled with the projection unit. The lamp receiving opening extends rearwardly from a forward wall of the magazine, so that the housing forms a continuous interior film channel about this opening. The projection aperture is located in the forward wall contiguous to the lamp opening, so that light generated by the lamp passes through the projection gate to project the image through a shutter mechanism which is mounted on the projecting apparatus itself.

The magazine is formed generally as a longitudinally and laterally elongated housing having a substantially plane lower surface for sliding engagement with a substantially plane upper surface provided on the projection apparatus. The magazine is assembled with the projector merely by moving the magazine downwardly and forwardly onto the upper surface of the projector, in such a manner that the projection lamp, which protrudes upwardly from the plane surface of the projector, is received in the aforementioned lamp opening of the magazine. The projector is provided with guides extending longitudinally of the magazine for directing the latter accurately into a registered position for projection. As the magazine reaches this position, a film gate located in the projection aperture engages the claws of a conventional intermittent feed device mounted on the projector; and locating lugs mounted on the projector engage mating slots in the film gate to insure accurate registration.

In preferred forms of the invention, a sound head is at the same time moved into the sound aperture by cooperating drive means on the magazine and the projector, actuated by entry of the magazine into the registered position. The sound head must engage the film with a predetermined pressure within the sound aperture to afford proper sound reproduction. According to the preferred embodiments of the invention, the cooperating drive means are arranged automatically to withdraw the sound head immediately upon any movement of the magazine to remove it from the projector. In this manner, accidental injury to the sound head which might otherwise result from careless handling is positively prevented. Various mechanical devices for achieving this result are contemplated by the invention, and several forms are described hereinafter.

While the invention concludes with claims particularly pointing out the subject matter which I regard as my invention, it is believed that a clearer understanding may be gained from the following detailed description of preferred embodiments, referring to the accompanying drawings, in which:

FIGURE 1 is a plan view of a preferred embodiment of the magazine, shown in assembled relation with the projector;

FIGURE 2 is a fragmentary view in side elevation;

FIGURE 3 is a sectional plan view, taken along line 3—3 in FIG. 2, looking in the direction of the arrows;

FIGURE 4 is a sectional view taken along line 4—4 in FIGURE 1, looking in the direction of the arrows;

FIGURE 5 is a pictorial view of a projection apparatus suitable for use with the magazine and projector of the invention;

FIGURE 6 is a fragmentary sectional plan view of a modified form of magazine;

FIGURE 7 is a fragmentary sectional plan view of another modification of the film magazine;

FIGURE 8 is a sectional view taken along line 8—8 in FIGURE 7, looking in the direction of the arrows; and FIGURE 9 is a view in side elevation of another modification of the film magazine, shown in assembled relation with a fragmentary portion of a modified projection apparatus.

Referring to FIGURES 1–4, the improved projection apparatus generally comprises a projector 10, arranged to receive a magazine 12 for reproducing visual and sound recordings from a reel of film 14. The film is wound in an endless coil about a reel 16, which is rotatably supported by means of a shaft 18 journaled in opposed top and bottom walls 20 and 22, respectively, of the magazine. The film is drawn from the interior of the roll serially to a drive sprocket 24, a projection gate 26, a sound gate 28, about a second drive sprocket 30, and is thence returned to the outer periphery of the endless coil. Arrangement is made, as will be later described, for actuating the drive sprockets, feeding the film intermittently through the projection gate, projecting the images on the film, and reproducing a sound track at the sound gate, by means mounted on the projector. These means are engaged automatically when the magazine is assembled with the projector in the registered position shown in the drawings.

The housing of the magazine 12 comprises, in addition to the top and bottom walls 20 and 22, a connecting side wall 32 and a forward wall 34. A projection lamp opening 36 is formed through the top and bottom walls of the housing, rearwardly adjacent to the front wall 34, to receive a projection lamp 38 therein. The magazine is enclosed about the opening 36 by a wall 40 connected with the top and bottom walls of the housing, and extended forwardly into close proximity to the film gate 26. The housing may be formed of any suitable material, although plastic is preferred to permit convenient inspection of the film.

The elements mounted within the magazine will now be described in serial order of the film movement. The housing walls 20 and 22 are spaced apart somewhat more than the lateral dimension of the film, since it is necessary to draw the film outwardly from the center of the roll over the reeled portion thereof, as appears in FIGURES 1 and 4. To avoid scraping, the film is given an initial twist by means of a wire 42 extending adjacent to the reel between two guiding wall segments 44 and 46, which are cemented between the top and bottom walls of the housing. The film then passes about the drive sprocket 24, being guided and held in engagement with the sprocket pins by means of an arcuate guide 48, which is preferably formed of bakelite or other nonabrasive material. A further guiding wall segment 50 of sinuous form serves to extend the film in a free loop into the film gate 26. As is well understood in the art, this loop is necessary to permit intermittent feeding of the film frame-by-frame in the film gate, while the drive sprocket 24 feeds continuously.

Upon passing through the film gate, the film is formed into a second free loop by means of guiding wall segments 52 and 54. These provide sufficient spacing between the projection gate 26 and the sound gate 28 to occupy 56 frames of the film, by which length the sound track trails the photographic image in conventional sound movie films. The film is then guided by means of an idler wheel 56, journaled in the top and bottom walls of the housing, toward the sound gate 28. Before arriving at the sound gate, the film is passed between a pair of rubbing blocks 58 and 59, preferably having felted surfaces, to establish a slight amount of drag on the film. This drag maintains a more uniform rate of movement of the film over the sound pick-up mechanism, so as to avoid distortion or "warbling" of the sound.

Pairs of guide blocks 60 and 61 are attached to the upper and lower walls of the housing to engage the edges of the film and thereby guide it through the sound gate in accurate registration with a magnetic sound pick-up head 62. The sound gate 28 preferably comprises a flexible fiber-backed plate, and is biased gently against the sound pick-up head by means of a wire spring 64 supported between a pair of vertical pins 66, to insure uniform response.

From the sound gate, the film is passed about the drive sprocket 30, being guided thereabout and held in engagement with the sprocket pins by a second arcuate guide 68, similar to the guide 48. The film is then returned to the outer periphery of the reeled portion, passing under a guide wire 70, which prevents the reeled film from riding upwardly off the reel 16.

The magazine is registered upon an upper plane surface 74 of the projector 10 by means of longitudinal guide walls 76 and 78, and abuts against an upstanding abutment wall 80 when positioned as shown for projection. A pair of upstanding pins 82 extend from the surface 74 to latch the magazine in this position. The magazine may be assembled with the projector merely by moving it forwardly and downwardly to position the projection lamp 38 in the opening 36, and to bring the plane surface of the lower wall 22 into contact with the upper plane surface 74 of the projector. A finger slot or depression 84 is formed in the surface 74 at the rear of the projector to permit convenient removal of the magazine, which is achieved by an upward and rearward motion.

Means are provided for automatically engaging the sound pick-up head, an intermittent film-feeding mechanism, and driving means for the feed sprockets, all of which are contained in the projector 10, in operative relation to corresponding elements of the magazine, upon insertion of the magazine into the registered position shown. In the embodiment shown, the sound head 62 is carried by a bell crank lever 86, which is pivoted on an upstanding trunnion 88 extending from the upper surface 74 of the projector. A tension spring 90 is secured to the lever 86 and to an upstanding pin 92, to bias the sound head counter-clockwise as viewed in FIG. 1, away from a sound pick-up aperture 94 formed in the side wall 32 of the magazine housing. The opposite leg of the lever 86 terminates in a finger 96, which upon movement of the magazine to the registered position, is engaged by a projection 98 in the front wall 34 of the magazine, and driven clockwise to cause the sound head 86 to enter the aperture 94 and engage the film. Immediately upon rearward movement of the magazine by a user, the lever is released and withdraws the sound pick-up head from the aperture 94 so that it will not be damaged.

The drive sprockets 24 and 30 are arranged to be driven by means of vertical shafts 100 and 102, respectively, which are journaled at their upper ends in bosses, of which one appears at 104 in FIG. 4, formed in the projector housing. The upper end of each shaft is recessed as at 106, and terminates substantially flush with the upper plane surface 74. For driving cooperation with the shafts, the sprockets are formed with frusto-conical splines 108, and these project slightly downwardly through the lower wall 22 of the magazine. Driving connection between each spline 108 and a shaft 100 or 102 is made automatically as the magazine is brought into the registered position, and broken immediately upon removal of the magazine.

The projector includes a conventional shutter wheel 110 which is rotatably mounted on an axle (not shown) below the surface 74, and provided with openings in the form of arcuate sectors, between which the projected image is occulted during those intervals when the film is being fed forwardly to bring successive frames into the gate. The shutter is arranged to be rotated by a flexible belt 112. Intermittent film-feeding means of conventional form are also provided; these include a claw 114 pivotally mounted on the shutter axle, and provided with a pair of teeth 116 for engaging sprocket openings formed in an edge of the film. The claw is driven both normally to and longitudinally of the film, by cam means (not shown) formed in the shutter wheel. The claw is actuated in a manner to advance the film one frame length through the projection gate, to withdraw the teeth from the film, and then to reengage the teeth with successive sprocket openings for feeding the next frame. This apparatus is of a conventional form well known in the art, and further detailed description is therefore believed unnecessary. The film gate 26 is provided with an elongated slot 118 to permit access of the teeth 116 to the film, and to aid in guiding the claw in its reciprocating movements.

For accurate registration of the magazine with the shutter and intermittent feed mechanism, one or more lugs 120 are provided in the abutment wall 80 of the projector, preferably being formed in a metallic plate 122 recessed into the abutment wall. The lugs are received in mating openings in the gate 26, and thus positively align the entire projection apparatus.

The projected film image passes through an opening 26 in the film gate 26, through a projection aperture 127 in the wall 34, and thence to the shutter and to a lens 124 mounted on the projector. A wire spring 128 urges the projection gate into engagement with the film to insure its passage in a flat condition before the projection lamp.

Means are shown in FIG. 3 for driving the sprocket shafts 100, 102, and for actuating the shutter 110 and the claw 114. These means comprise a motor 130 mounted in the base of the projector, driving a worm 132 and a sheave 134 through a shaft 136. The flexible belt 112 passes about the sheave 134 and the shutter wheel, for actuating the intermittent feed mechanism as well as the shutter itself. The worm 132 engages gears 137 and 138, which are drivingly connected with the sprocket shafts 102 and 100, respectively.

The improved magazine-loaded projector may desirably be mounted in a self-contained projection unit generally shown at 140 in FIG. 5. The projection apparatus is mounted within a casing 142, having a projection screen 144 and an internal system of reflecting mirrors (not shown) for projecting from a magazine 146 accessibly mounted at the front of the casing. A sound system including a speaker 148 is also enclosed in the casing. This arrangement permits movies to be reproduced in the home by means of a compact and self-contained unit, without advance preparation.

Various means for automatically inserting the sound pick-up head into the sound aperture of the magazine are contemplated by the invention, and a first modification is shown in FIG. 6. In this figure, parts similar to those of the preceding embodiment are similarly numbered, with subscripts "a." The forward wall 34a of the magazine contains the sound aperture 94a, and the sound pick-up head 62a is borne by a lever 150 pivoted on a trunnion 152 projecting upwardly from the projector 10a. The sound head is biased in a counterclockwise direction, as viewed in FIG. 6, by means of a tension spring 154 connected to an upstanding pin 156. The spring 154 serves to bias the sound head against the film 14a and the sound gate 28a, as the magazine is brought forwardly into registered position against the abutment wall 80a. Upon the initiation of rearward and upward movement of the magazine to remove it from the projector, the spring 154 causes the sound head to follow the magazine, and this movement is limited by means of an upstanding pin 158. In this embodiment, a relatively elongated guide wall segment 160 is provided to afford a 56-frame loop between the projection gate 26a and the sound gate 28a, and an idler roll 162 is provided to hold the loop in position. An additional pair of idler rolls 164 is provided to feed the film through the projection gate in a direction generally parallel to the front wall of the magazine.

Another form of drive means for positioning the sound head is shown in FIGS. 7 and 8, in which parts similar to those of the preceding embodiment are similarly numbered, with subscripts "b." In this instance, a three-dimensional camming action is provided, so that the sound head will be withdrawn from the sound aperture upon the initiation of movement of the magazine in any direction, whether horizontal or vertical. This arrangement renders it difficult or impossible to damage the sound head through mishandling of the magazine. The sound head 62b is carried by a lever 166 pivoted on a trunnion 168 in the upper surface of the projector 10b. A compression spring 170 abuts a stud 172 formed on the projector housing, and biases the lever and the sound head clockwise as viewed in FIG. 7, toward the sound aperture 94b. A stop pin 174 limits this movement when the magaizne is removed from the projector. The lever 166 is provided with a cam follower comprising a hemispherical protrusion 176, for cooperation with a three-dimensional cam 178 mounted on the wall 32b of the magazine. The cam 178 is chamfered at its leading and trailing edges (FIG. 7), and also at its lower edge (FIG. 8), and is provided with a recess 180 into which the follower 176 falls only when the magazine is in registered position against the abutment wall 80b of the projector, as shown.

As the magazine is initially moved toward the assembled position on the projector, the follower 176 engages the chamfered surfaces of the cam 178, and moves the sound head 62b away from the magazine until such time as the latter is registered, when the sound head is permitted to enter the aperture 94b and engage the film therein. Any substantial movement of the magazine causes the sound head to be lifted from the aperture, and thus the possibility of damage is prevented.

Still another form of the means for positioning the sound head is shown in FIG. 9, in which parts similar to those of the preceding embodiments are similarly numbered, with subscripts "c." A cam latch 182 is pivoted rearwardly of the projector 10c on a pin 182, extending upwardly from the surface 74c through a suitable opening 184. The latch 180 is drivingly connected with the sound head 28c by means of a linkage including a link 186 connected to one arm of a bell crank 188, and an arm 190 connected to the opposite leg of the bell crank and pivoted within a suitable opening 192 in the projector housing by means of a pin 194. The bell crank is rotatable in its own plane about a trunnion 196, such that movement of the latch 180 counter-clockwise as viewed in the drawing, withdraws the sound head from the sound aperture 94c, and clockwise movement causes it to enter the aperture to engage the film. A compression spring 198 is interposed between the latch 180 and a depending abutment 200 of the projector housing, to bias the linkage in a direction to withdraw the sound head from the aperture. As the magazine 12c is brought forwardly toward the registered position shown, and abuts the wall 80c, its rearward edge engages the curved upper surface of the latch 180. As the magazine is pushed downwardly against the surface 74c, it causes the latch to rotate counter-clockwise to drive the sound head into the magazine aperture. To remove the magazine from the projector, it is first necessary to raise it upwardly with respect to the latch, and this movement releases the linkage to withdrawn the sound head.

While I have shown and described preferred embodiments of my invention by way of illustration, it will be apparent to those skilled in the art that various changes and modifications may be made without departing from the true spirit and scope of the invention, which I therefore intend to define in the appended claims without limitation to details of the aforesaid embodiments.

What I claim is:

1. A magazine-loaded motion picture projector comprising, in combination:

a magazine comprising longitudinally and laterally elongated housing having a substantially plane lower surface and a forward wall extending transversely to said lower surface, said housing defining an enclosure for an endless coil of film and having a projection aperture in said forward wall and a cooperating gate, and means for feeding film through said gate;

and a projector including a projection lamp, a shutter mechanism, an intermittent film-feeding mechanism, and a drive means for said film-feeding means;

said projector being formed with a substantially plane upper surface and abutment means protruding upwardly therefrom, for abutment with said lower surface and said forward wall, respectively, in a registered juxtaposition of said magazine and said projector; said upper surface further being formed with guide means for slidably engaging said magazine; said projection lamp protruding from said upper surface of said projector, and said lower surface of said magazine being formed with an opening relatively rearwardly of said forward wall for receiving said lamp; said shutter protruding from said upper surface forwardly of said abutment means and being aligned with said projection aperture and gate in the registered juxtaposition, whereby a light beam from said lamp passes through film in said projection gate to said shutter mechanism;

said film-feeding mechanism being operatively aligned with said projection aperture and gate, and said drive means drivingly engaging said film-feeding means, in the registered juxtaposition; whereby assembly of said magazine with said projector into said registered juxtaposition with the elements thereof in operative relation for displaying motion pictures is accomplished by a relative forward and downward movement of said magazine, guided by said guide means, and disassembly is accomplished by a relative upward and rearward displacement of the magazine.

2. A magazine-loaded motion picture projector as recited in claim 1, said magazine having a cooperating sound aperture and gate, said feeding means being arranged to feed film serially through said projection gate and said sound gate; said projector having a sound pick-up head constructed and arranged for operative alignment with said sound aperture in the registered juxtaposition.

3. A magazine-loaded motion picture projector as recited in claim 2, said sound pick-up head being movably mounted on said projector for movement to a pick-up position interfering with completion of assembly or disassembly of said magazine with said projector, and to a non-interfering position; together with cooperating driving and driven means mounted on said magazine and said projector, respectively, for automatically moving said sound pick-up head into said pick-up position extending into said sound aperture against film in said sound gate upon movement of said magazine into the registered juxtaposition, and for automatically moving said sound pick-up head out of said sound aperture and into the non-interfering position upon initial movement of said magazine away from the registered juxtaposition.

4. A magazine-loaded motion picture projector as recited in claim 3, in which a lever pivotally mounted on said projector carries said sound pick-up head, said driven means comprising a cam follower mounted on said lever, said driving means comprising a three-dimensional cam mounted on said magazine, and spring means biasing said lever in a direction to move said sound head toward said sound aperture as said magazine is moved toward the registered juxtaposition, said three-dimensional cam having chamfered edges for initial non-jamming engagement with said cam follower, having a rise operative to move said sound head away from said magazine as said movement is continued, and having a recess to receive said cam follower and permit said spring means to move said sound head into said sound aperture as the magazine arrives in the registered juxtaposition.

5. A magazine-loaded motion picture projector as recited in claim 3, in which a lever pivotally mounted on said projector carries said sound pick-up head, said driving and driven means comprising cooperating cam means for actuating said lever to move said sound head into said sound aperture as said magazine is moved into the registered juxtaposition, and spring means biasing said lever in a direction to withdraw said sound head from said sound aperture upon initial movement of said magazine from the registered juxtaposition.

6. A magazine-loaded motion picture projector as recited in claim 5, said cam means of the projector comprising a latching lever engaging said magazine rearwardly in the registered juxtaposition, the rearward edge of said magazine comprising the cam means thereof, said latching lever being operative to latch the magazine in the registered juxtaposition.

References Cited by the Examiner
UNITED STATES PATENTS

| | | | |
|---|---|---|---|
| 2,449,705 | 9/48 | Jones | 88—17 |
| 2,568,734 | 9/51 | Heyer | 88—17 |
| 2,804,508 | 8/57 | Mastling | 88—17 |

FOREIGN PATENTS 273,360  6/27  Great Britain.

JULIA E. COINER, *Primary Examiner.*

EMIL G. ANDERSON, NORTON ANSHER,
*Examiners.*